United States Patent
Lin et al.

(10) Patent No.: US 12,518,110 B2
(45) Date of Patent: Jan. 6, 2026

(54) TEXT GENERATION METHOD AND APPARATUS

(71) Applicant: Alibaba Group Holding Limited, Grand Cayman (KY)

(72) Inventors: Xuming Lin, Hangzhou (CN); Zhongzhou Zhao, Hangzhou (CN); Ji Zhang, Hangzhou (CN); Liming Pu, Hangzhou (CN); Jiashuo Zhang, Hangzhou (CN)

(73) Assignee: Alibaba Group Holding Limited, George Town (KY)

( * ) Notice: Subject to any disclaimer, the term of this patent is extended or adjusted under 35 U.S.C. 154(b) by 404 days.

(21) Appl. No.: 17/588,025

(22) Filed: Jan. 28, 2022

(65) Prior Publication Data

US 2022/0253613 A1   Aug. 11, 2022

(51) Int. Cl.
*G06F 40/40* (2020.01)
*G06F 40/166* (2020.01)
*G06F 40/205* (2020.01)
*G10L 13/08* (2013.01)

(52) U.S. Cl.
CPC ............ *G06F 40/40* (2020.01); *G06F 40/166* (2020.01); *G06F 40/205* (2020.01); *G10L 13/08* (2013.01)

(58) Field of Classification Search
CPC ...... G06F 40/40; G06F 40/166; G06F 40/205; G06F 40/279; G06F 40/56; G10L 13/08; G10L 15/26; G06Q 30/0625; G06Q 30/0641
See application file for complete search history.

(56) References Cited

U.S. PATENT DOCUMENTS

| | | | |
|---|---|---|---|
| 11,250,947 B2 | 2/2022 | Divine et al. | |
| 11,756,093 B2* | 9/2023 | Aher | G06Q 30/0269 705/7.29 |
| 11,861,674 B1* | 1/2024 | Huang | G06V 10/764 |
| 2007/0078889 A1* | 4/2007 | Hoskinson | G06F 16/35 707/999.102 |

(Continued)

FOREIGN PATENT DOCUMENTS

| | | |
|---|---|---|
| CN | 103914151 | 7/2014 |
| CN | 105528452 | 4/2016 |

(Continued)

OTHER PUBLICATIONS

Cho et al. "Describing Multimedia Content using Attention-based Encoder-Decoder Networks". arXiv:1507.01053v1 [cs.NE] Jul. 4, 2015 (Year: 2015).*

(Continued)

*Primary Examiner* — Jesse S Pullias
(74) *Attorney, Agent, or Firm* — Lee & Hayes, P.C.

(57) ABSTRACT

A method including acquiring source data related to an object; acquiring one or more pieces of source data related to the object; analyzing the source data to obtain one or more pieces of material information; parsing the material information to obtain one or more pieces of corresponding text paragraph information; and generating the text describing the object using the text paragraph information. Using the techniques described herein, users comprehensively understand the object according to the generated text directly without having to conduct a large number of searches.

17 Claims, 10 Drawing Sheets

(56) References Cited

U.S. PATENT DOCUMENTS

| | | | |
|---|---|---|---|
| 2012/0215661 A1 | 8/2012 | Baran | |
| 2019/0180733 A1* | 6/2019 | Saito | G06F 3/16 |
| 2020/0042646 A1* | 2/2020 | Nagaraja | G06F 16/345 |
| 2020/0074013 A1* | 3/2020 | Chen | G06F 40/30 |
| 2020/0311158 A1* | 10/2020 | Huet | G06Q 30/0623 |
| 2021/0118035 A1* | 4/2021 | Misawa | G06N 5/04 |
| 2021/0150546 A1* | 5/2021 | Zhu | G06Q 30/0282 |
| 2021/0174031 A1* | 6/2021 | Wang | G06F 40/30 |
| 2021/0174784 A1* | 6/2021 | Min | G06N 3/0442 |
| 2021/0406993 A1* | 12/2021 | Sethi | G06N 3/084 |
| 2022/0114349 A1* | 4/2022 | Sollami | G06F 16/35 |

FOREIGN PATENT DOCUMENTS

| | | | | |
|---|---|---|---|---|
| CN | 109584013 | | 4/2019 | |
| CN | 110909130 A | * | 3/2020 | G06F 16/3331 |
| CN | 111368562 A | | 7/2020 | |
| CN | 112199970 | | 1/2021 | |
| CN | 112232052 A | | 1/2021 | |
| CN | 112287168 A | | 1/2021 | |
| WO | WO-2021142999 A1 | * | 7/2021 | G06F 3/167 |

OTHER PUBLICATIONS

First Examination Report for CN Application CN111368562A, dated Nov. 20, 2024.

First Search Report for CN Application CN111368562A, dated Nov. 20, 2024.

Translation of CN Office Action mailed Jun. 12, 2025, 11 pages.

\* cited by examiner

TEXT GENERATION METHOD AND APPARATUS

CROSS REFERENCE TO RELATED APPLICATIONS

This application claims priority to Chinese Patent Application No. 202110163592.9, filed on 5 Feb. 2021 and entitled "TEXT GENERATION METHOD AND APPARATUS," which is incorporated herein by reference in its entirety.

TECHNICAL FIELD

The present disclosure relates to the technical field of data processing, and, more particularly, to text generation methods and apparatuses.

BACKGROUND

As information increases rapidly, descriptive information for objects is characterized by many modalities and large amounts of information. How to enable users to better understand an object without having to manually conduct a large number of searches is a current problem that needs to be addressed urgently.

Take an object being a commodity as an example, introduction information of the commodity includes information in multiple modalities such as text, pictures, and video recordings. A user needs to browse the information in the multiple modalities to comprehensively know the commodity, which undoubtedly increases the browsing time of the user and degrades user experience.

Therefore, a solution that enables a user to better understand an object without having to conduct a large number of searches is needed.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a solution that enables a user to better understand an object without having to conduct a large number of searches.

According to an example of the present disclosure, a text generation method is provided. The method is used to generate text related to an object, comprising: acquiring one or more pieces of source data related to the object; analyzing the source data to obtain one or more pieces of material information; parsing the material information to obtain one or more pieces of corresponding text paragraph information; and generating the text describing the object using the text paragraph information.

According to an example of the present disclosure, a text generation apparatus is provided. The apparatus is configured to generate text related to an object, comprising: an acquiring module, configured to acquire one or more pieces of source data related to the object; an analyzing module, configured to analyze the source data to obtain one or more pieces of material information; a parsing module, configured to parse the material information to obtain one or more pieces of corresponding text paragraph information; and a generation module, configured to generate the text describing the object using the text paragraph information.

According to an example of the present disclosure, a computing device is provided. The computing device comprises: a processor; and a memory having executable code stored thereon, wherein the executable code, when executed by the processor, causes the processor to execute the method according to the first aspect.

According to an example of the present disclosure, a non-transitory machine-readable storage medium is provided. The non-transitory machine-readable storage medium has executable code stored thereon, wherein the executable code, when executed by a processor of an electronic device, causes the processor to execute the above method.

In the present disclosure, one or more pieces of source data related to the object are acquired; the source data is analyzed to obtain one or more pieces of material information; the material information is parsed to obtain one or more pieces of corresponding text paragraph information; and the text describing the object is generated using the text paragraph information. In this way, users comprehensively understand the object according to the generated text directly without having to conduct a large number of searches.

BRIEF DESCRIPTION OF DRAWINGS

Example implementations of the present disclosure are described in further detail with reference to the accompanying drawings, so that the foregoing and other objectives, features, and advantages of the present disclosure become more apparent. In the example implementations of the present disclosure, the same reference numerals generally represent the same components.

DESCRIPTION OF EMBODIMENTS

Hereinafter, the example embodiments of the present disclosure will be described in further detail with reference to the accompanying drawings. Although the accompanying drawings show the example embodiments of the present disclosure, it should be understood that the present disclosure may be implemented in various forms and should not be limited by the embodiments set forth herein. Rather, these embodiments are provided to make the present disclosure more thorough and complete and to fully convey the scope of the present disclosure to those skilled in the art.

The present disclosure proposes that materials may be extracted from various types of data related to an object, text narratives corresponding to the materials may be found, text paragraphs are generated based on the text narratives, and text paragraphs are combined to generate text used to describe the object. In this way, the text may be presented or broadcast to a user, enabling the user to better understand the object without having to conduct a large number of searches.

Figure 1:
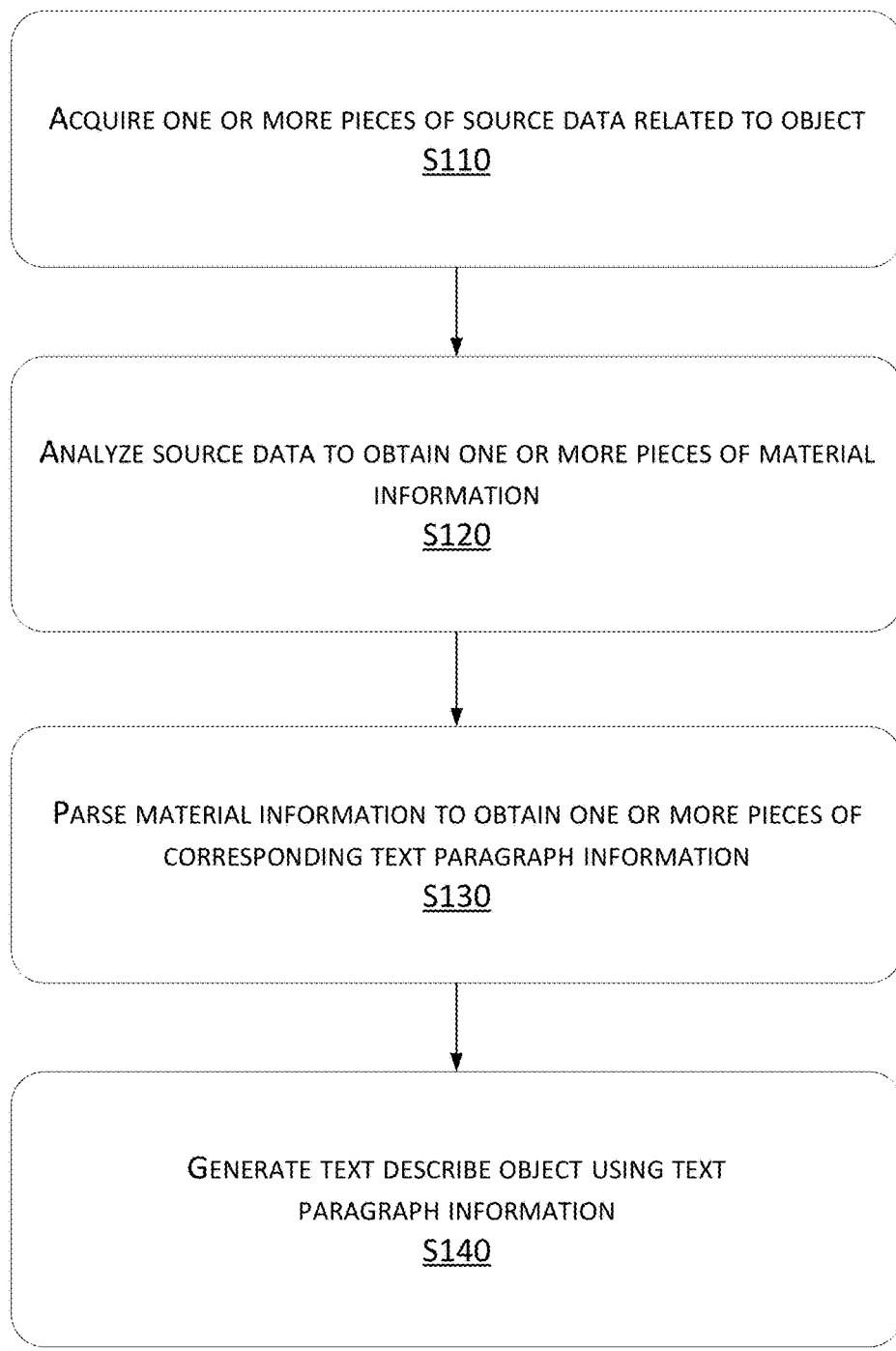
FIG. 1 is a schematic flowchart of a text generation method according to an embodiment of the present disclosure.

FIG. 1 is a schematic flowchart of a text generation method according to an embodiment of the present disclosure. The method shown in FIG. 1 may be implemented as software through a computer program, or the method shown in FIG. 1 may be executed using a specifically configured computing apparatus.

Refer to FIG. 1. Step S110: acquire one or more pieces of source data related to an object.

The object may be, but is not limited to, of various types, including a commodity, an application program, and an audiovisual program (such as music, a movie, TV series, and a novel).

The source data may be various types of object-related data acquired using data acquisition methods, including but not limited to, webpage crawling and data sharing, and may, for example, include data in various modalities (that is, multiple types), such as text, pictures, audio recordings, and video recordings. For example, the acquired source data may include pictures, text, images (video recordings, pictures, animations, or the like), sound, and combinations thereof.

Step S120: analyze the source data to obtain one or more pieces of material information.

The source data may be deemed as raw data directly acquired and not processed. The material information may be deemed as data further obtained by analyzing the source data, i.e., data extracted from the source data.

When material information is viewed in terms of data source, the material information may include unprocessed source data, and processed data on which preset analysis processing is performed. The unprocessed source data refers to data that may be directly used as material information in the source data. The processed data on which preset analysis processing is performed refers to new data obtained after the source data is analyzed.

When material information is viewed in terms of data function, the material information refers to materials useful for generating the text for describing the object. For example, the material information may include: materials that may provide content for text generation, i.e., the below-discussed materials corresponding to text paragraph information on which text generation depends; and materials that may be used to guide an output sequence of content of the generated text, an example of which is the below-discussed materials on which the creation of a text output frame that may guide an output sequence of the text content depends.

When material information is viewed in terms of data types, the material information may include, but is not limited to, at least one of a text material, an audio material, a picture material, and a video material.

The process of analyzing source data to obtain the material information may be considered as a process of mining the source data to enrich the material information. As types of source data vary, methods for analyzing the source data to obtain the material information are also different.

For example, for picture-type source data, text information in a picture may be recognized to obtain first material information including the picture and the text information. Text content of the picture may be recognized through the optical character recognition (OCR) technology.

For text-type source data (such as first text), second material information that includes second text used to describe the object may be obtained based on the first text. Based on the first text, the second text may be obtained through the text generation technology.

For audiovisual-type source data, audiovisual data may be analyzed to obtain third material information that includes at least one of audiovisual data, a speech recognition result of audiovisual data, and audiovisual analysis data. The audiovisual data may be video data and/or audio data. The audiovisual analysis data may include, but is not limited to, playing frequencies, click frequencies, forwarding frequencies, interaction frequencies, comments, viewers, and the like of the audiovisual data. Take the audiovisual data being live broadcasting data of the object as an example. The audiovisual analysis data may further include the association relationship between the live broadcasting content at different times and indicator data (such as the click frequencies and the order frequencies of a commodity) at corresponding times. The indicator data may reflect the importance (or attractiveness and popularity) of the live broadcasting content at a corresponding time. For example, the indicator data is positively correlated with the importance (or attractiveness and popularity) of the corresponding live broadcasting content.

Step S130: parse the material information to obtain one or more pieces of corresponding text paragraph information.

The text paragraph information may be deemed as a text description corresponding to the material information, and each piece of text paragraph information may be composed of one or more sentences. As described above, the material information may include, but is not limited to, at least one of a text material, an audio material, a picture material, and a video material. For different types of material information, text paragraph information corresponding to the material information may be obtained using different methods.

For example, for a text material, the text material may be directly used as text paragraph information or the text material may be further processed and the obtained text therefrom is used as text paragraph information; and/or for an audio material, speech recognition may be performed on the audio material to obtain text paragraph information corresponding to the audio material; and/or for a picture material and/or a video material, semantic understanding may be performed on the picture material and/or the video material to obtain text paragraph information corresponding to the picture material and/or the video material.

For example, semantic understanding may be performed on the picture material based on image caption (IC) technology and/or visual storytelling technology, so as to obtain text paragraph information used to describe content of the picture material. Semantic understanding may be performed on multiple video frames of a video material based on the visual storytelling technology, so as to obtain text paragraph information used to describe content of the multiple video frames.

The image caption technology combines computer vision, natural language processing, and machine learning technologies, and is used to transform pictures into descriptive text.

For the implementation principle of the image caption technology, reference may be made to the prior art, and details of such are not repeated herein.

The visual storytelling technology generates corresponding story content based on pictures, picture sequences, and video frame sequences, and can generate a coherent story based on picture sequences. For the implementation principle of the visual storytelling technology, reference may be made to the prior art, and details of such are not repeated herein.

Step S140: generate the text describing the object using the text paragraph information.

The text paragraph information may be combined to generate the final text describing the object. As an example, content of the text paragraph information may be reorganized to obtain the final text used to introduce the object. Content reorganization refers to re-arranging the provided text paragraph information to bring varieties of the text content.

For example, the text used to introduce the object may be generated based on the text paragraph information by using a pre-trained text generation model. The text generation model may be, but is not limited to, an encoder-decoder model, which may include an encoding part (an encoder) and a decoding part (a decoder). The encoding part is configured to encode an input into a vectorized representation, and the decoding part is configured to read the vectorized representation and output the text. The input of the text generation model may include, but is not limited to, a name of the object, attribute information of the object (such as an attribute name and an attribute value of the object), and the text paragraph information. In this way, a name of the object, attribute information of the object, and the text paragraph information may be inputted into a pre-trained text generation model, so as to obtain the text.

An object may include one or more attributes, which are used to represent characteristics of the object. Characteristics represented by an attribute may include, but are not limited to, an appearance characteristic, a function characteristic, a user characteristic, and an application scenario characteristic of the object. Depending on the object types, attributes of the objects and characteristics represented by the attributes are also different. Take the object being a commodity as an example. Attributes of the object may include, but are not limited to, categories (such as brands, types, basic styles, suitable users, application scenarios, main material content, and style details of the commodity), sold quantity, price, popularity, and favorable rating of the commodity.

As an example, before the text describing the object is generated based on the text paragraph information (i.e., step S140), a part of text paragraph information may also be selected from the obtained text paragraph information. Thus, when step S140 is executed, the text describing the object may be generated based on the selected text paragraph information. Multiple pieces of text paragraph information may be selected based on an external input. For example, after the text paragraph information is obtained, the text paragraph information may be presented to the user, and text paragraph information used for text generation is selected according to the user's selection operation.

In the present disclosure, a text output frame may be created according to a preset rule; and an output sequence of the text paragraph information is determined based on the text output frame, such that the text is generated. Thus, the text output frame instructs the output sequence for the text paragraph information, and the text describing the object is generated based on the text paragraph information and according to the output sequence therefor, so that the output sequence of the content (i.e., the content layout) of the generated text is more logical. For example, the created text output frame may further be adjusted to make the text output frame more accurate. The output frame may be adjusted based on an external input. For example, the created text output frame may be displayed to the user, so that the user may adjust the text output frame, for example, the user may adjust, according to his or her own experience, an obviously illogical part of the text output frame.

As an example, the text output frame may be created based on at least a part of the material information, and the created text output frame therefrom may be used to instruct the output sequence of the text paragraph information obtained based on the material information. The material information obtained by analyzing the source data may be divided into two parts according to the functions: one part is used to provide content for text generation, i.e., providing the text paragraph information, and the other part is used to create the text output frame. These two parts of materials may overlap.

The text output frame may be used to indicate the output sequence of attributes of the object. When the output sequence of the text paragraph information is to be determined based on the text output frame, attributes related to the text paragraph information may be determined by performing, but not limited to, semantic analysis on the text paragraph information. The output sequence of the attributes indicated by the text output frame may be used as the output sequence for the text paragraph information. When a single piece of text paragraph information includes multiple attributes, a cumulative result of output sequences of the multiple attributes indicated by the text output frame may be used as the output sequence of this piece of text paragraph information. Alternatively, priorities may be set for different attributes. When a single piece of text paragraph information includes multiple attributes, a cumulative result of the output sequences of the multiple attributes indicated by the text output frame at corresponding weights may be used as the output sequence of this piece of text paragraph information. Alternatively, an output sequence of an attribute with the highest priority among the multiple attributes indicated by the text output frame may be directly used as the output sequence of the text paragraph information.

When the source data is analyzed to obtain one or more pieces of material information, one or more attributes of the source data may be analyzed at the same time, and the text output frame may be created according to corresponding attributes. For example, the text output frame used to indicate an attribute output sequence may be created according to the attribute occurrence frequency and/or attribute search popularity. Priorities of output sequences of the attributes are positively correlated with the attribute occurrence frequency and/or attribute search popularity. The attribute occurrence frequency refers to the frequency at which an attribute occurs in the material (or the source data), and the attribute search popularity may be determined according to history search records of one or more users.

When it is considered that the outputted attributes of an object are associated to a certain degree, attributes that are strongly associated mostly occur in the same text paragraph information. Therefore, a similarity level between materials having different attributes may further be calculated, and attributes corresponding to materials having a similarity level greater than a threshold may be combined into one attribute. The similarity level may refer to the degree of semantic matching or character string matching between materials.

For example, the similarity level between materials having different attributes may be calculated by using, but not limited to, the deep structured semantic model (DSSM) and/or the longest common subsequence (LCS). The DSSM is used to calculate a semantic matching degree, and the LCS is used to calculate a character string matching degree. For related knowledge of the DSSM and the LCS, reference may be made to the prior art.

Calculating the similarity level between materials having different attributes may refer to treating all the materials having related attributes as a whole, and then calculating the similarity level between materials having different attributes. Combining the attributes corresponding to the materials having a similarity level greater than the threshold into one attribute means that, when the output sequence of the attributes is to be determined, the attributes corresponding to the materials having a similarity level greater than the threshold are considered as one attribute.

For example, assuming that materials for attribute A include a sentence A1 and a sentence A2, and materials for attribute B include a sentence B1 and a sentence B2. If a similarity calculation indicates that "sentence A1+sentence A2" is similar to "sentence B1+sentence B2," then attribute A and attribute B are considered similar attributes. When the output sequence of attribute A and attribute B is to be determined, attribute A and attribute B may be combined into one attribute C. The calculated output sequence for attribute C is used as the output sequence for attribute A and attribute B.

As an example, the material information obtained by analyzing the source data may include audio material and/or video material. Considering that the text output sequences for the audio material and the video material may reflect, to some extent, the output sequence of the text in reality, the present disclosure may adjust the text output frame using the audio material and/or the video material. For example, the text output frame may be adjusted based on a speech recognition result obtained from speech recognition performed on the audio material, and/or video analysis data obtained from analyzing the video material. The video analysis data is the above-mentioned audiovisual analysis data. Take the audiovisual data being the live broadcasting data as an example. The audiovisual analysis data may be used to facilitate the creation of a text output frame that conforms to the output sequence of live broadcasting scenario logics; the audiovisual analysis data may further ensure that the output sequence of the created text output frame reflects the importance (or attractiveness and popularity) of the content.

In the present disclosure, the text paragraph information may further be connected using a join sentence template generated in advance. In this way, connecting guide words are applied to the text paragraph information using the join sentence template, so that the join logics between the text paragraph information may be determined or adjusted, making context of the generated text to flow smoothly and more naturally.

For example, the join logics (i.e., the connecting logics) between different text paragraph information (or different sentences) of the text may be set (or adjusted or modified) by using the join sentence template generated in advance. For example, a join sentence between different text paragraph information may be determined by using the join sentence template, and the join sentence is a sentence used to join (or connect) pieces of context. The join sentence template may facilitate the connecting logics between sentences to distinguish content topics described in the context. Using the manual writing method, on the other hand, requires much manpower. Therefore, using the join sentence template can greatly reduce consumption of human resources. The join sentence template may be trained by using the natural language generation technology and the machine learning technology. For example, a pair of sentences may be used as a sample input, and the connecting logics (such as join sentences) between sentences is used as a label to train the join sentence template. The specific training process will not be elaborated in the present disclosure.

As an example, in the present disclosure, one or more pieces of material information and one or more pieces of corresponding text paragraph information may be selected; the text paragraph information may be converted into voice information; and the material information and the voice information may be combined as demo data and presented on a user interface. Thus, the present disclosure may be used to automatically generate an introduction clip for an object and provide voice playback with text paragraph information.

Figure 2:
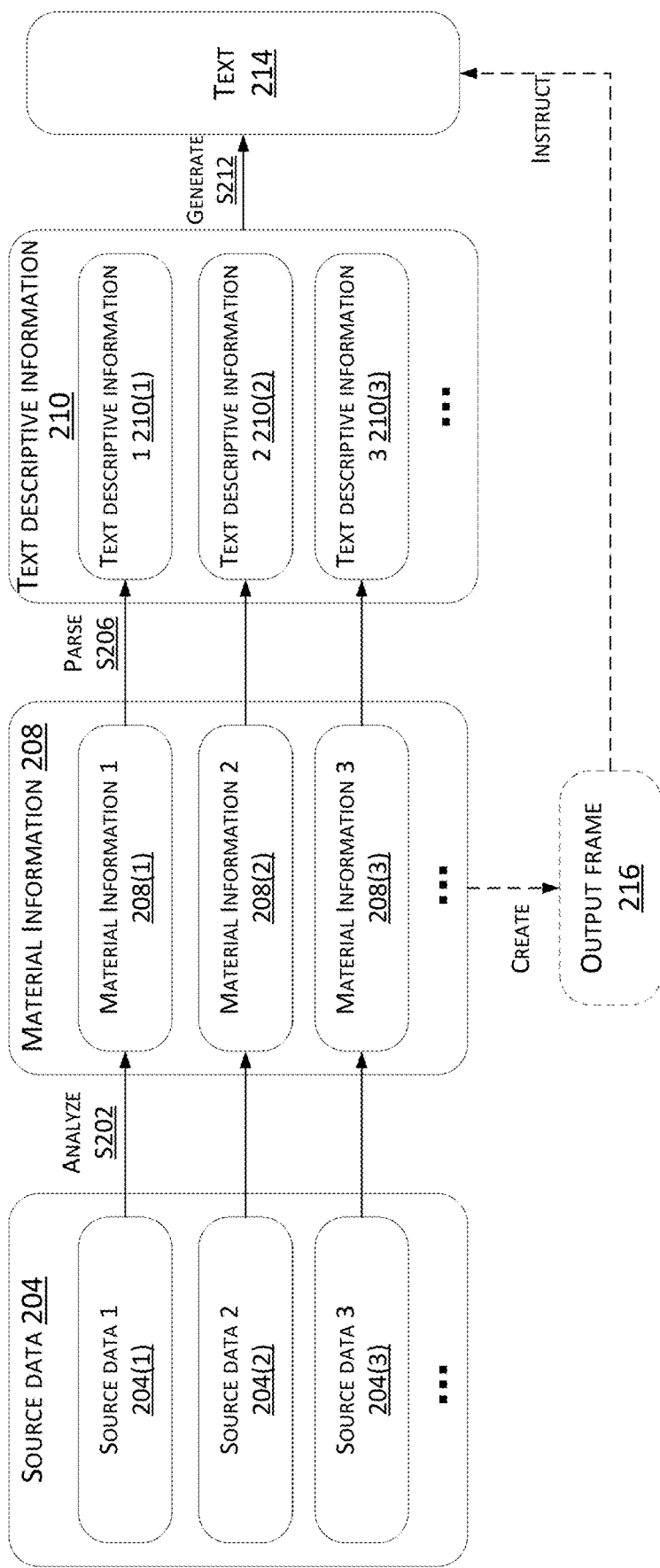
FIG. 2 is a schematic flowchart of a text generation method according to another embodiment of the present disclosure.

FIG. 2 is a schematic flowchart of a text generation method according to another embodiment of the present disclosure.

Refer to FIG. 2. Step S202: analyze source data 204 related to an object to obtain material information based on the source data. For the process of obtaining the material information based on the source data, reference may be made to the above-mentioned related description, and details are not repeated herein. The source data 202 may include one or more source data such as source data 1 204(1), source data 2 204(2), source data 3 204(3), etc.

Step S206: after the material information 208 is obtained, parse the material information to obtain text descriptive information of the material information 208. The material information 208 may include one or more material information such as material information 1 208(1), material information 2 208(2), material information 3 208(3), etc.

The text descriptive information 210 is also the text paragraph information mentioned above. The text descriptive information 210 may include one or more text descriptive information such as text descriptive information 1 210(1), text descriptive information 2 210(2), text descriptive information 3 210(3), etc.

The text descriptive information 210 may be considered as the text analysis result of the material information 208, and is used to describe the material information 208 in a text format. The parsed material information refers to materials used to provide content for text generation. For the process of obtaining the text descriptive information 210 based on the material information 208, reference may be made to the above-mentioned related description, and details are not repeated herein.

Step S212: generate the text 214 used for describing the object based on the text descriptive information.

The text descriptive information 210 mentioned herein may be text descriptive information obtained by parsing various types of material information 208 such as a text material, an audio material, a picture material, and a video material. The generated text 214 may include one or more paragraphs.

As shown in the dashed line in FIG. 2, the output frame 216 used to indicate the content output sequence may also be created based on at least a part of the material information 208, and the output sequence of the text content is determined using the output frame 216. The output frame is the text output frame mentioned above. For the output frame, please refer to the above-mentioned description for the text output frame, and details are not repeated herein.

After the output sequence of sentences in the text is determined based on the output frame, the text may be broadcast according to the determined output sequence, or the content of the text may be typesetted according to the determined output sequence, and the text may be displayed visually.

The text generation method of the present disclosure may also start from step S206. That is, the material information related to the object may be directly acquired and parsed to obtain the text descriptive information of the material information. The text used to describe the object is generated based on the text descriptive information. For details involved in the method, please refer to the related description above. Details are not repeated in the present disclosure.

Take the present discourse being applied to the field of e-commerce as an example. The present disclosure may be implemented as a text generation method for commodities, and is used to generate text for a commodity. The method includes: acquiring one or more pieces of source data related to the object; analyzing the source data to obtain one or more pieces of material information; parsing the material information to obtain one or more pieces of corresponding text paragraph information; and generating the text describing the object using the text paragraph information. For details involved in the method, please refer to the related description above. Details are not repeated in the present disclosure.

Take the present disclosure being applied to the field of e-commerce for example. The present disclosure further provides a live broadcasting method, including acquiring text used to introduce a commodity; and broadcasting the text when the commodity is presented with a live video related to the commodity. The broadcast text may be the text obtained based on the text generation method of the present disclosure. The text may be broadcast by a human anchor or a virtual anchor.

The present disclosure further provides an information presentation method, including: displaying multiple options on a screen of an electronic device, wherein each option corresponds to a commodity; in response to a selection operation from a user, displaying a detail page of a commodity selected by the user; and broadcasting the text used to introduce the commodity. The broadcast text may be the text obtained based on the text generation method of the present disclosure.

Figure 3:
FIG. 3 is a schematic diagram of a detail page of a commodity according to an embodiment of the present disclosure.

The text used to introduce the commodity may be automatically broadcast at the same time as or after the detail page of the commodity is presented. Alternatively, as shown in FIG. 3, a playback button 302 may be set on the detail page of the commodity. The text used to introduce the commodity may be played in response to a user's clicks on the playback button. In FIG. 3, the text 304 is "this electric toothbrush has three modes: cleaning, sensitive, and whitening, and can meet teeth brushing requirements in multiple states."

Details of the present disclosure are further explained below with reference to specific embodiments.

Figure 4:
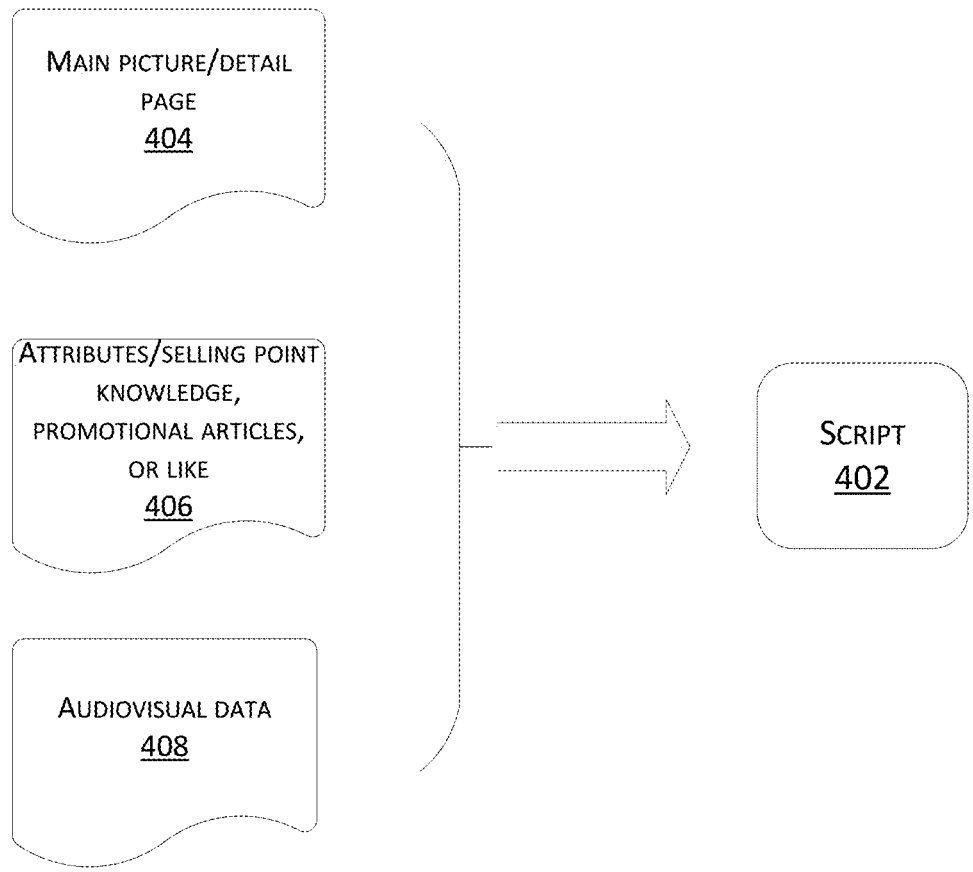
FIG. 4 is a schematic diagram of a constructing principle for a script according to an embodiment of the present disclosure.

FIG. 4 is a schematic diagram of a constructing principle for a script 402 applied to the field of e-commerce live broadcasting according to an embodiment of the present disclosure.

As shown in FIG. 4, in the present disclosure, data related to an object in various modalities, such as the main picture/detail page 404, attributes/selling point knowledge and promotional articles 406, and audiovisual data 408 may be acquired, and the script 402 used to describe the object and suitable for broadcasting is generated through the above text generation method.

The script may be text or an introduction clip with voice playback and text. Users may have a full understanding of the object when the script is presented or broadcast thereto. The main picture/detail page is the main page carrying descriptive information of the object. For example, the main picture/detail page may be the most important picture among multiple pictures related to the object, i.e., the picture having a large amount of information. A selling point refers to characteristics or attributes of the object that can attract consumers, such as the function, the price, and the sold volume of the object. Selling point knowledge may refer to a knowledge set related to the selling point of the object. Attribute knowledge may refer to a knowledge set related to the attributes of the object. For attributes and audiovisual data, please refer to the related description above. Details are not repeated herein.

Take the object being a commodity for example. Data related to the commodity in various modalities, such as the main picture of the commodity, the detail page of the commodity, attributes/selling point knowledge, promotional articles, and live broadcasting data may be processed and converted into text that conforms to the live broadcasting scenario logics or converted into a clip used to introduce the commodity.

Take the object being an application program for example. Data related to the application program in various modalities, such application program charts, application program images, promotional videos, slogans, downloads, and player comments may be processed and converted into text that may provide a full introduction for the application program. Users who have not had the application program installed will be able to fully understand the application program through the presentation or broadcasting of the text made to them.

For other types of objects, text used to introduce the objects and obtained based on the text generation method of the present disclosure may be outputted to users through visual presentation or voice playback. Users may also have a full understanding of the application program using this method. In the present disclosure, application scenarios of other types of objects are not further elaborated herein.

Taking into account that information for objects (such as commodities) is presented in various modalities such as text, pictures, and videos, it is thus necessary to analyze the information of the objects in various modalities, so as to obtain the text that offers a full introduction to the objects.

The process of analyzing the information in various modalities usually requires a lot of manpower and material resources. For example, a lot of manpower and material resources need to be invested in researching the objects as well as processing and editing data related to the objects in various modalities. If the data of the object in various modalities can be automatically processed and converted into text (such as a script that conforms to the live broadcasting scenario logics and is suitable for broadcasting, or a clip used to introduce the object) that can provide a full description for the object, a lot of manpower would be saved and the materials in various modalities can also be used efficiently, thus enriching the information and providing various presentations at the same time.

However, constructing the text based on information in various modalities is very challenging. The reasons are as follows: the source data on which the text is constructed is characterized by its large data volume, various content sources, and rich information in various modalities. In addition, if data in various modalities is processed based on manual customization and manual screening, usually the association among the data in various modalities cannot be used properly.

Figure 5:
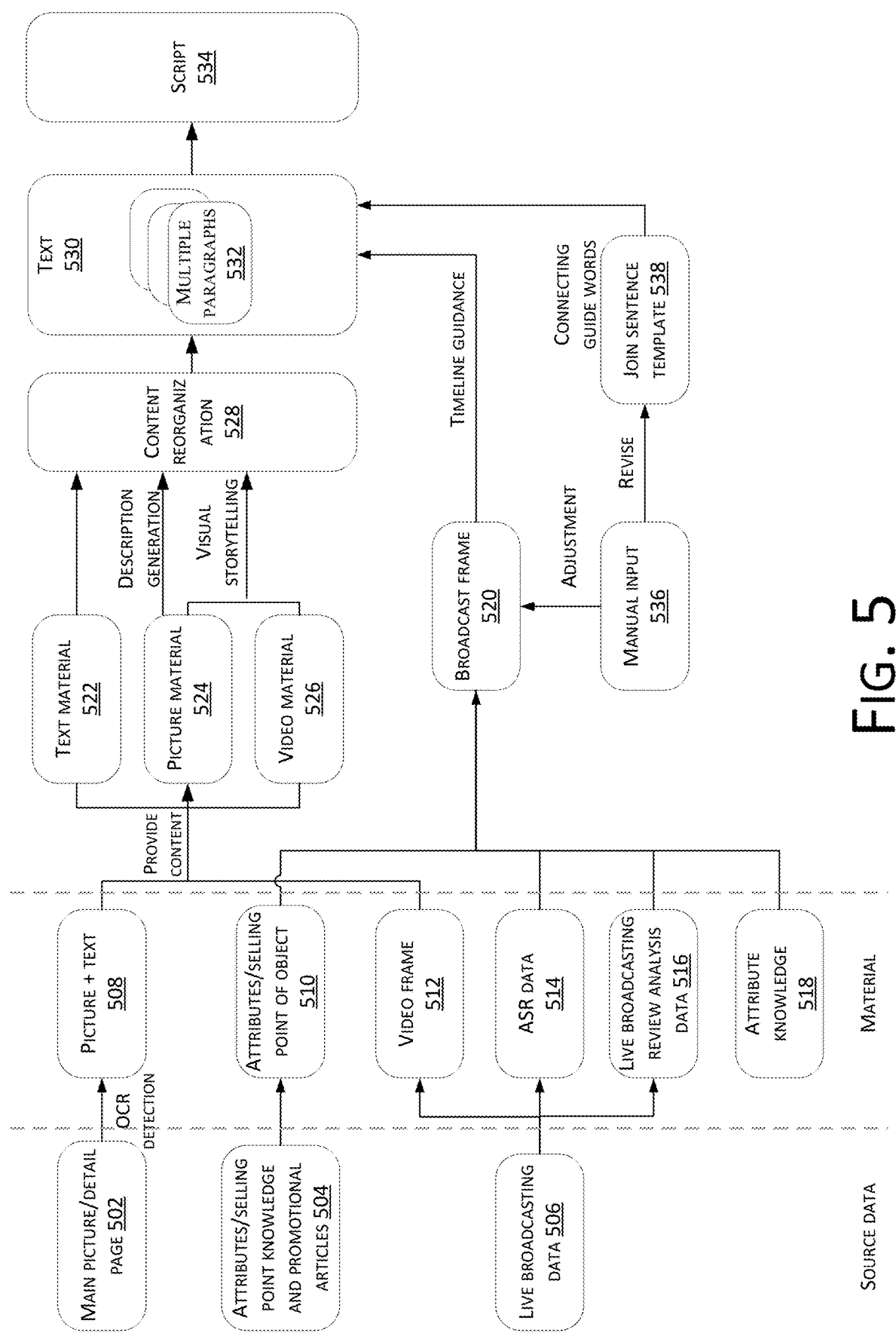
FIG. 5 is a schematic flowchart of constructing a script based on data of an object in multiple modalities according to an embodiment of the present disclosure.

In the text generation method disclosed in the present disclosure, the text used to introduce the object may be automatically constructed based on data of the object in various modalities without having to include extensive human labors. FIG. 5 is a schematic flowchart of constructing a script based on data of an object in multiple modalities according to an embodiment of the present disclosure.

As shown in FIG. 5, the source data may include: the main pictures/commodity detail page 502, attributes/selling point knowledge and promotional articles 504, and live broadcasting data 506.

For the main pictures/commodity detail page, text information in the pictures may be recognized using the OCR technology, so as to obtain a picture material including "picture+text" 508. For attributes/selling point knowledge and promotional articles 504, descriptive sentences used to describe the attributes and selling points of object 510 may be obtained. For the live broadcasting data 506, video frame data 512, ASR data 514, and live broadcasting review analysis data 516 may be obtained by parsing the live broadcasting data 506. The video frame data 512 refers to video frames included in live broadcasting video data within the live broadcasting data. The ASR data 514 refers to the speech recognition result obtained by performing speech recognition on live broadcasting audio data in the live broadcasting data by using the automatic speech recognition (ASR) technology. The live broadcasting review analysis data 516 refers to the analysis result obtained by performing review analysis on the live broadcasting data. The live broadcasting review analysis data 516 is mainly used to create the output frame. Therefore, the live broadcasting review analysis data 516 may be data that can instruct the output sequence for the content. For example, the live broadcasting review analysis data 516 may include analysis data of the association between the live broadcasting content and one or more indicators, such as the number of live broadcasting views, the number of comments, the number of forwarding times, the number of increased fans, the number of commodity clicks, the number of orders, the number of payments, etc. For example, the live broadcasting review analysis data 516 may include the association between the live broadcasting content at different times and indicator data (such as the number of clicks and the order number of the object) at corresponding times. The indicator data may reflect the importance (or attractiveness and popularity) of the live broadcasting content at corresponding times. For example, the indicator data is positively correlated with the importance (or attractiveness and popularity) of the corresponding live broadcasting content.

Thus, the material obtained by analyzing the source data may include: graphic information such as the picture+text 508, sentences used to describe the attributes/selling point of the object 510, video frames 512, ASR data 514, live broadcasting review analysis data 516, and the attribute knowledge 518.

Some of the above materials (such as graphic information like the picture+text 508, the attributes/selling point of object 510, and video frame 512) are used to provide content for text generation. The other materials (such as the attributes/selling point of object 510, ASR data 514, live broadcasting review analysis data 516, and the attribute knowledge 518) are used to create the broadcast frame 520. The broadcast frame mentioned herein is a frame that conforms to the broadcasting logics of the live broadcasting scenario.

1. Text Generation Process

Materials used to provide content for text generation may include a text material 522, a picture material 524, and a video material 526. The text material 522 may be put aside temporarily without processing. That is, the text material 522 may be directly used in content reorganization for generating the text.

For the picture material 524, text descriptive information of the picture (corresponding to the first text descriptive information mentioned above) may be obtained using the image captioning technology, where the text descriptive information may be descriptive sentences.

For the picture material 524 and video material 526, semantic understanding may be performed on the picture/video frames using the visual storytelling technology, so as to generate and obtain the text descriptive information that describes or introduces a subject object in the pictures/video frames. For example, content reorganization 528 is conducted to obtain text 530 including multiple paragraphs 532 to form a script 534, which is partly based on the timeline guidance from the broadcast frame. The manual input 536 may be used to adjust the broadcast frame 520. The manual input 536 may also be used to revise the join sentence template 538 connecting guide words that form the multiple paragraphs 532.

Figure 6:
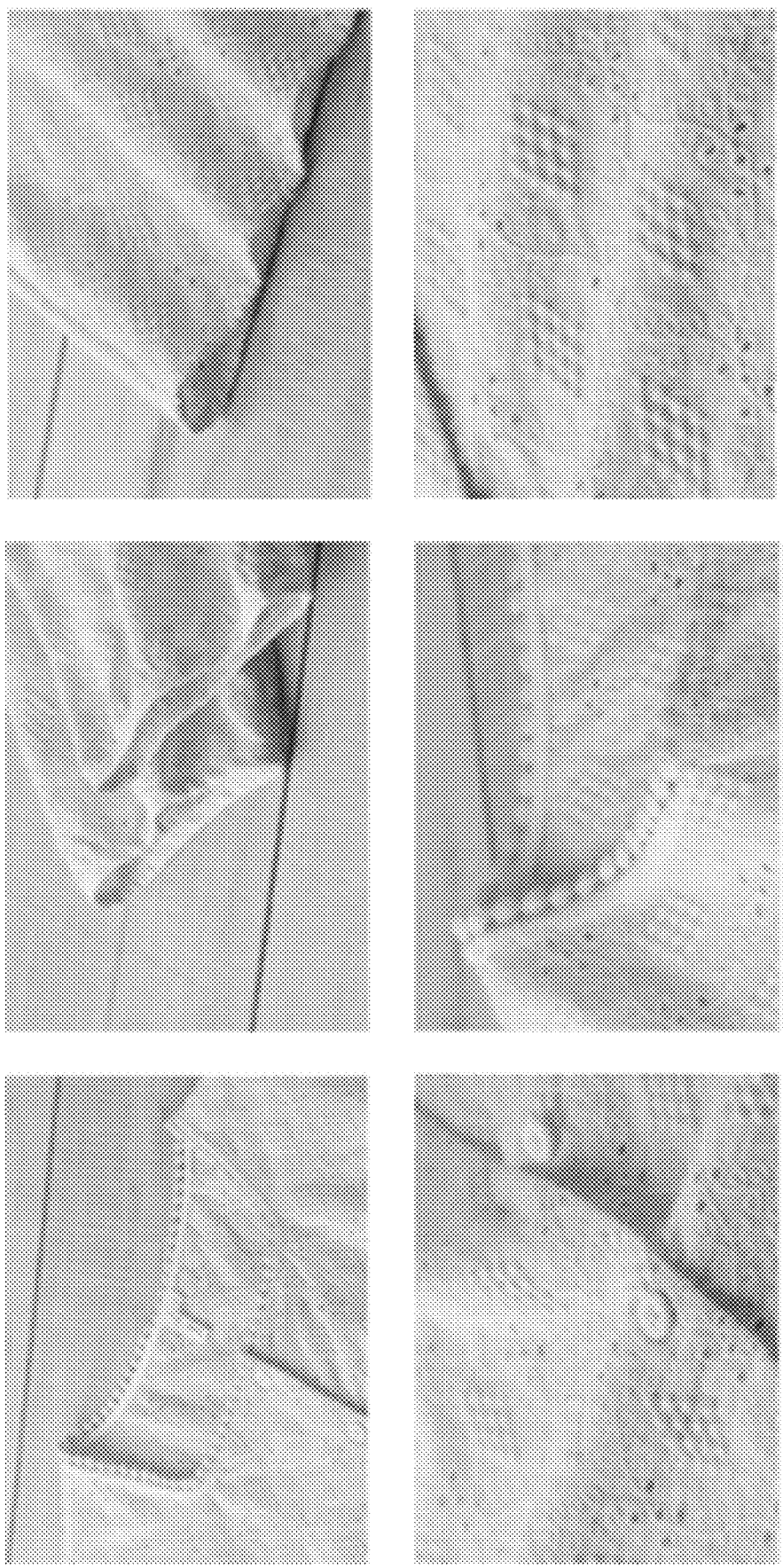
FIG. 6 is a schematic diagram of multiple pictures of a commodity.

For example, with regard to the series of pictures shown in FIG. 6, the following text may be obtained by using the visual storytelling technology: "The neckline of this shirt is a round one and hand-knitted with very fine workmanship. The lower edges of the shirt are aligned properly. Buttons are sewn manually; a great fit to the body without feeling out of place. The cuffs are loose, and wearers won't feel warm in hot weather. The pattern on the shirt is very beautiful."

Then, the text material and the text descriptive information obtained based on the picture material and the video material may be reorganized to enrich the text content and bring more varieties.

Figure 7:
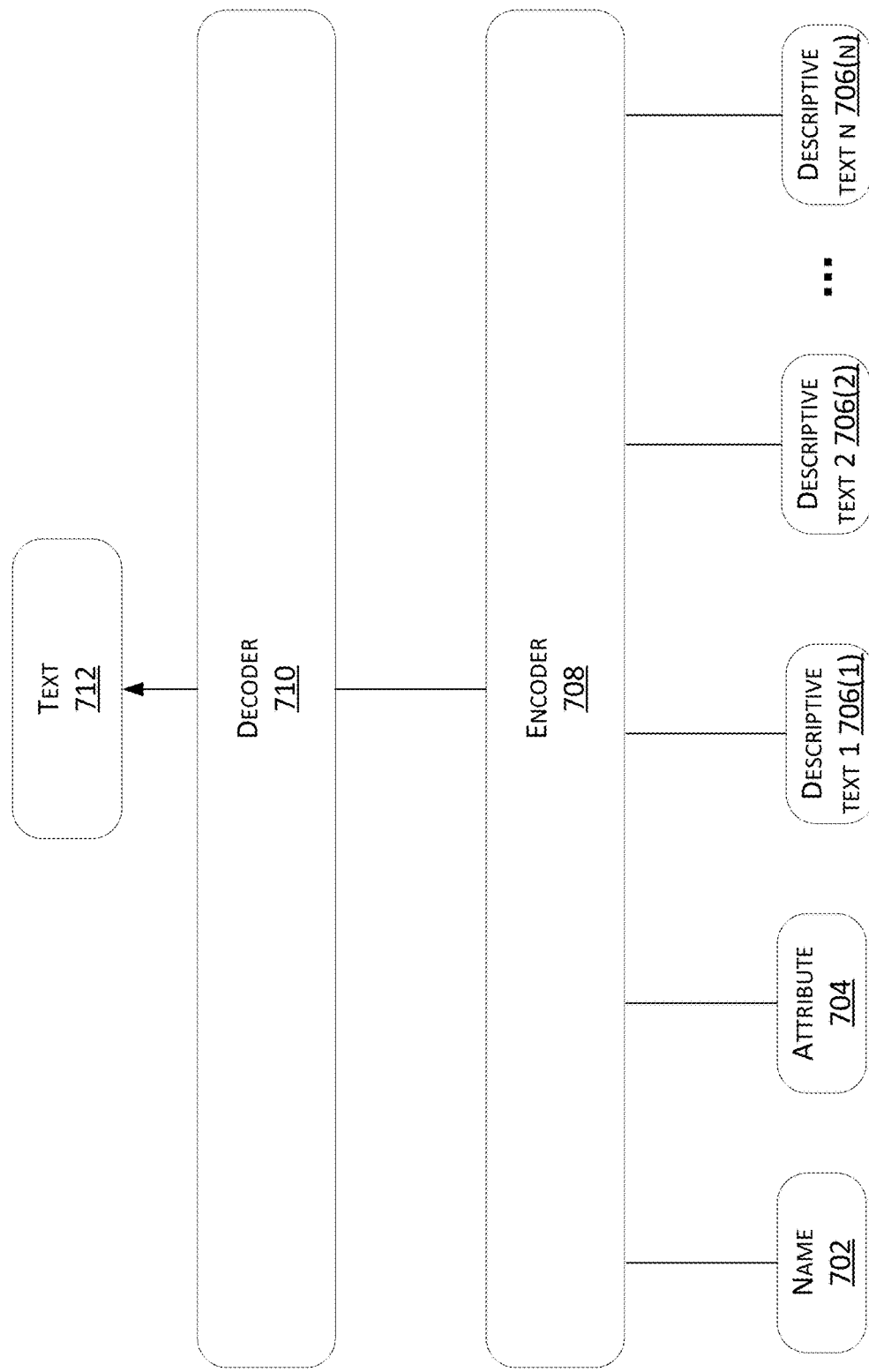
FIG. 7 is a schematic diagram of a content reorganizing principle according to an embodiment of the present disclosure.

FIG. 7 is a schematic diagram of a content reorganizing principle according to an embodiment of the present disclosure.

As shown in FIG. 7, the object name 702, object attribute 704, and multiple pieces of descriptive text including descriptive text 1 706(1), descriptive text 2 706(2), . . . , descriptive text n 706(n) may be inputted into a text generation model including an encoder 708 and a decoder 710, so as to obtain the text 712 in paragraphs. n may be any integer.

The object attribute may be attributes related to multiple pieces of descriptive text. If no object attributes are related to the multiple pieces of descriptive text, the inputted object attribute may be null.

The multiple pieces of descriptive text may include: the text information obtained by performing OCR detection on the main picture/detail page, the descriptive sentence obtained based on the attribute/selling point knowledge, the descriptive sentence obtained based on pictures/videos, and so on.

Example 1

Multiple pieces of descriptive text may include the following sentences:

Sentence 1. With the round neckline design, the neck appears longer.

Sentence 2. With the mid-length pattern, the piece of clothing may serve as a skirt to go with other pieces.

Sentence 3. With the short-sleeve design, the piece of clothing shows a refreshing and pleasant appeal and makes arms look slimmer and beautiful.

An output obtained through the encoder and the decoder is as the text shown below:

It can be seen that this piece of clothing has a round-neckline design, which makes the neck appear longer. It can also be seen that the piece of clothing is short-sleeved and does not make wears warm. The mid-length design enables it to be worn as a skirt.

Example 2

Multiple pieces of descriptive text may include the following sentences:

Sentence 1. With the design of the bright silk element, the feminine feature is highlighted.

Sentence 2. With the bright silk embellishment, a different kind of allure is shown.

Sentence 3. The tear design emphasizes the charming wearing posture.

Sentence 4. The personalized creative tear design is very fashionable.

Sentence 5: The tear design of the piece of clothing may also bring a more fashionable appeal.

An output obtained through the encoder and the decoder is as the text shown below:

Decorated with bright silk, this sweater showcases a different kind of allure and highlights the feminine personality; and the fashionable tear design shows a charming posture when worn.

2. Broadcast Frame Creation Process

A broadcast frame (corresponding to the output frame described above) may be created based on the ASR data in the material information, the live broadcasting review analysis data, and the materials used to describe the attributes of the commodity. The material used to describe the attributes of the commodity may include a descriptive sentence (such as the attribute/selling point sentence) obtained based on the attribute/selling point knowledge, and the attribute knowledge. The attribute knowledge may be a knowledge set related to the attributes of the object.

Figure 8:
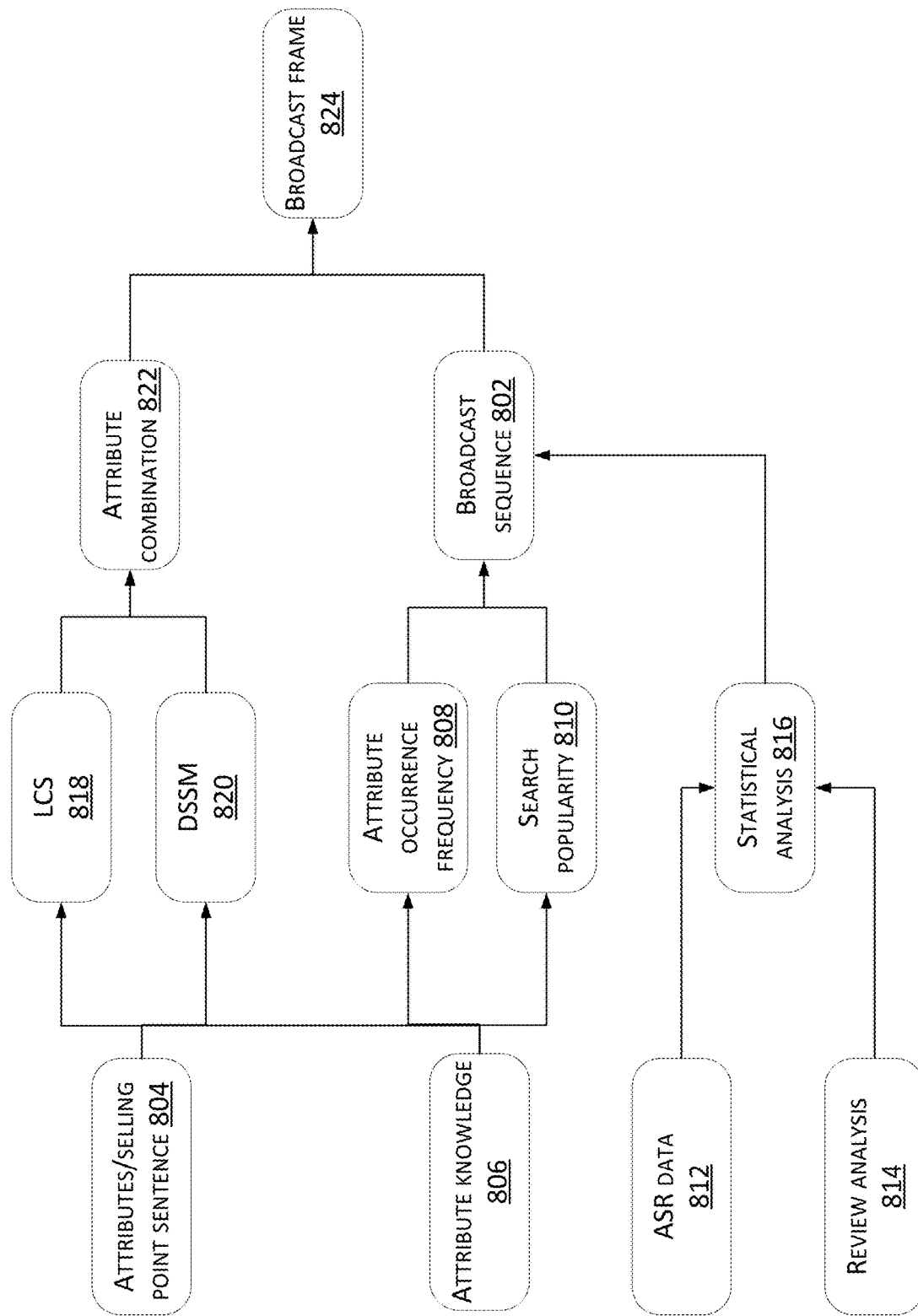
FIG. 8 is a schematic flowchart of creating a broadcast frame according to an embodiment of the present disclosure.

FIG. 8 is a schematic flowchart of creating a broadcast frame according to an embodiment of the present disclosure.

As shown in FIG. 8, the broadcast sequence 802 (corresponding to the output sequence described above) of the attributes may be determined according to the frequency at which the attributes appear in the material (the attributes/selling point sentence 804 and the attribute knowledge 806) and/or the search popularity corresponding to the attributes. For example, the attribute occurrence frequency 808 in the material and the attribute search popularity 810 in the material may be calculated to obtain an overall rating as the broadcast sequence of the attributes. Priorities of the broadcast sequences of the attributes are positively correlated with the attribute occurrence frequency and attribute search popularity. The attribute search popularity 810 may be determined according to history search records of multiple users.

When it is considered that the outputted attributes of an object are associated to a certain degree, attributes that are strongly associated are described in the same sentence or paragraph. In the present disclosure, a similarity level between materials having different attributes may further be calculated, and attributes corresponding to materials having a similarity level greater than a threshold may be combined into one attribute. The similarity level may refer to the degree of semantic matching or character string matching between materials.

The broadcast sequence of the broadcast content may be obtained according to the speech recognition result of the broadcast audio data, where the broadcast sequence 802 may be considered as the content broadcast sequence that conforms to the broadcast scenario logics. The broadcasting review analysis data obtained by analyzing live broadcasting data may reflect the importance of different broadcast content.

Therefore, the speech recognition result of the broadcast audio data such as ASR data 812 and the review analysis 814 such as the broadcasting review analysis data of the broadcast data may be used to facilitate the creation of the broadcast sequence 802 that conforms to the broadcast scenario logics though statistical analysis 816; the created broadcast sequence 802 may further be enabled to reflect the importance (or attractiveness and popularity) of the content. Thus, the speech recognition result and the broadcasting review analysis data may be analyzed to adjust the playback sequence of the attributes.

The attributes/selling point sentence 804 are analyzed by LCS 818 and DSSM 820 to obtain the attribute combination 822. The attribute combination 822 and the broadcast sequence are used to form the broadcast frame 824.

After the broadcast frame 824 is obtained, the broadcast sequence of the text content may be determined based thereon. As shown in FIG. 5, connecting guide words may be further applied onto the text using the join sentence template generated in advance to determine (or adjust) the join logics between sentences of the text.

In this way, a script suitable for broadcasting that conforming to the broadcasting scenario logics may be finally obtained.

The present disclosure supports the input and the automatic processing of data in multiple modalities. For example, in the present disclosure, a complete process is designed, so that data in multiple modalities from multiple sources may be used, and various modalities are mapped onto modal scripts according to the modal conversion method. Presentation in multiple modalities is implemented through the matching and mounting method. A complete process, from inputting in multiple modalities to presentation in multiple modalities, is constructed. Statistics of data in multiple modalities and algorithms are combined and applied to the broadcast content construction process to guide the content construction that conforms to the live broadcasting scenarios.

Figure 9:
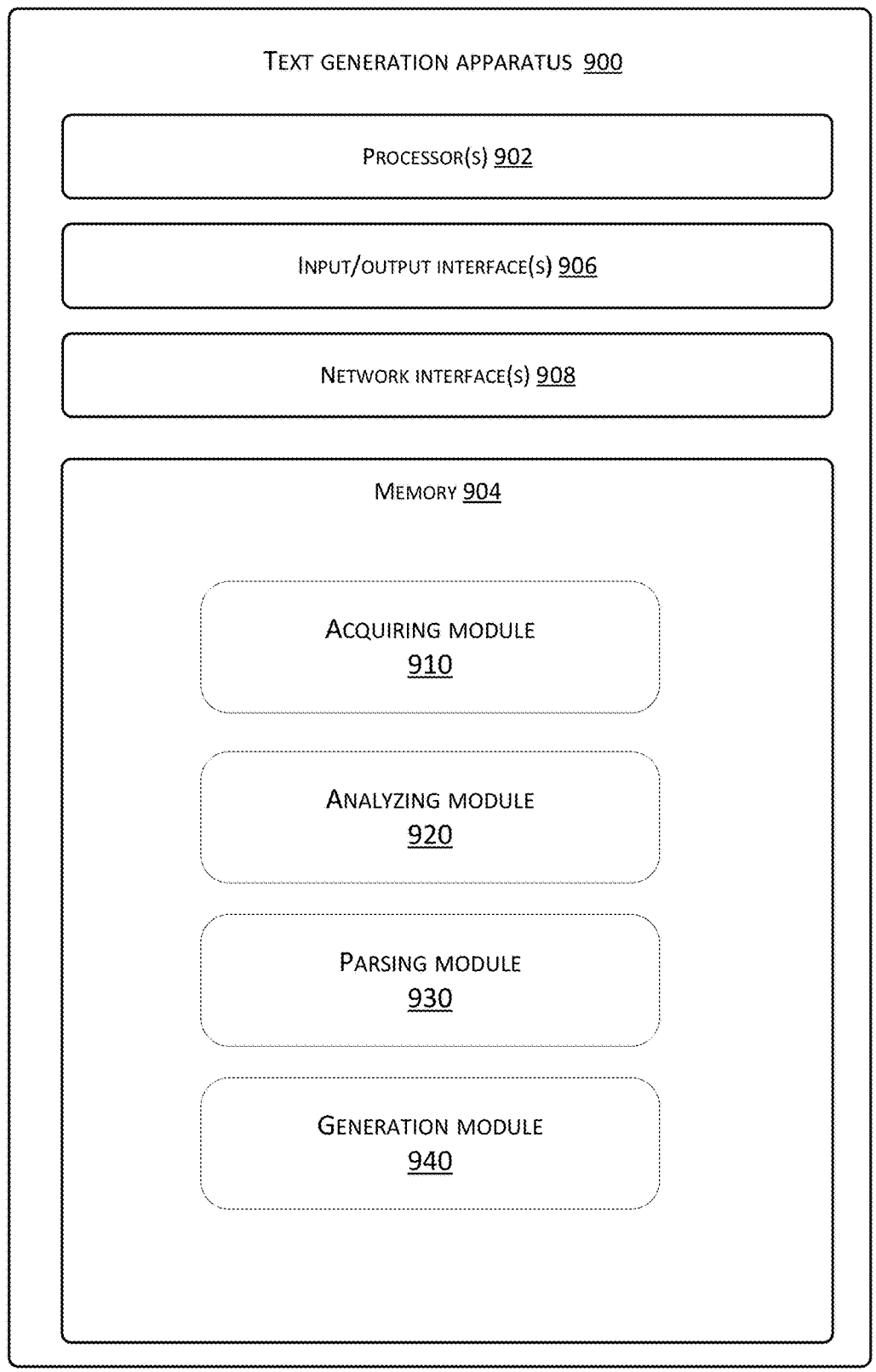
FIG. 9 is a schematic structural diagram of a text generation apparatus according to an embodiment of the present disclosure.

The text generation method of the present disclosure may also be implemented as a text generation apparatus. FIG. 9 is a schematic structural diagram of a text generation apparatus according to an exemplary embodiment of the present disclosure. Functional units of the text generation apparatus may be implemented by hardware, software, or a combination thereof that implements the principle of the present disclosure. Those skilled in the art can understand that the functional units in FIG. 9 may be combined or divided into subunits, thereby implementing the principle of the present invention. Therefore, the description herein may support any possible combination, or division, or further defining of the functional units described herein.

The following briefly describes functional units of the text generation apparatus and operations that may be performed by each functional unit. For the detailed involved therein, please refer to the above related description. Details are not repeated herein.

As shown in FIG. 9, a text generating apparatus 900 includes one or more processor(s) 902 or data processing unit(s) and memory 904. The device 900 may further include one or more input/output interface(s) 906 and one or more network interface(s) 908.

The memory 904 is an example of computer readable media. The computer readable media include non-volatile and volatile media as well as movable and non-movable media, and can implement information storage by means of any method or technology. Information may be a computer readable instruction, a data structure, and a module of a program or other data. An example of the storage media of a computer includes, but is not limited to, a phase-change memory (PRAM), a static random access memory (SRAM), a dynamic random access memory (DRAM), other types of RAMs, a ROM, an electrically erasable programmable read-only memory (EEPROM), a flash memory or other memory technologies, a compact disc read-only memory (CD-ROM), a digital versatile disc (DVD) or other optical storages, a cassette tape, a magnetic tape/magnetic disk storage or other magnetic storage devices, or any other non-transmission media, and can be used to store information accessible by the computing device. According to the definition in this text, the computer readable media does not include transitory computer readable media or transitory media such as a modulated data signal and carrier.

The memory 904 may store therein a plurality of modules or units including an acquiring module 910, an analyzing module 920, a parsing module 930, and a generation module 940.

The acquiring module 910 is configured to acquire one or more pieces of source data related to the object. The analyzing module 920 is configured to analyze the source data to obtain one or more pieces of material information. The parsing module 930 is configured to parse the material information to obtain one or more pieces of corresponding text paragraph information. The generation module 940 is configured to generate text describing the object using the text paragraph information.

The generation module 940 may further include a creating module and a determining module stored in the memory 904. The creating module is configured to create a text output frame according to a preset rule. The determining module is configured to determine, based on the text output frame, an output sequence of the text paragraph information, so as to generate the text.

The text generation apparatus 900 may further include an adjustment module stored in the memory 904, configured to adjust the output frame based on an external input.

The analyzing module 920 may analyze one or more attributes of the source data. The text generation apparatus 900 may further include a calculation module and a combination module. The calculation module is configured to calculate a similarity level between materials having different attributes; and the combination module is configured to combine attributes corresponding to materials having a similarity level greater than a threshold into one attribute.

The creating module may create the text output frame based on a corresponding attribute. The determination module may output the text paragraph information according to the output sequence.

The creating module may create, according to the attribute occurrence frequency and/or attribute search popularity, the text output frame used to indicate an attribute output sequence. The adjustment module may further adjust the text output frame based on an audio material and/or a video material.

The text generation apparatus 900 may further include a connection module stored in the memory 904, configured to connect the text paragraph information using a join sentence template generated in advance.

The text generation apparatus 900 may further include a selection module stored in the memory 904, configured to select a part of text paragraph information. The generation module 940 may generate the text describing the object using the text paragraph information.

The generation module 940 may input a name of the object, attribute information of the object, and the text paragraph information into a pre-trained text generation model to obtain the text.

The analyzing module 920 may obtain, through identifying text information in a picture, to obtain first material information including the picture and the text information; and/or obtain, based on first text, second material information including second text used to describe the object; and/or analyze the audiovisual data to obtain third material information that includes at least one of video data, a speech recognition result of the audiovisual data, and the audiovisual analysis data.

The parsing module 930 may perform speech recognition on the audio material to obtain the text paragraph information corresponding to the audio material; and/or perform semantic understanding on the picture material and/or the video material to obtain text paragraph information corresponding to the picture material and/or the video material.

As an example, the generation module 940 may select one or more pieces of material information and one or more pieces of corresponding text paragraph information, convert the text paragraph information into voice information, and combine the material information with the voice information as demo data. The text generation apparatus 900 may further include a presentation module, configured to present the demo data on a user interface.

Figure 10:
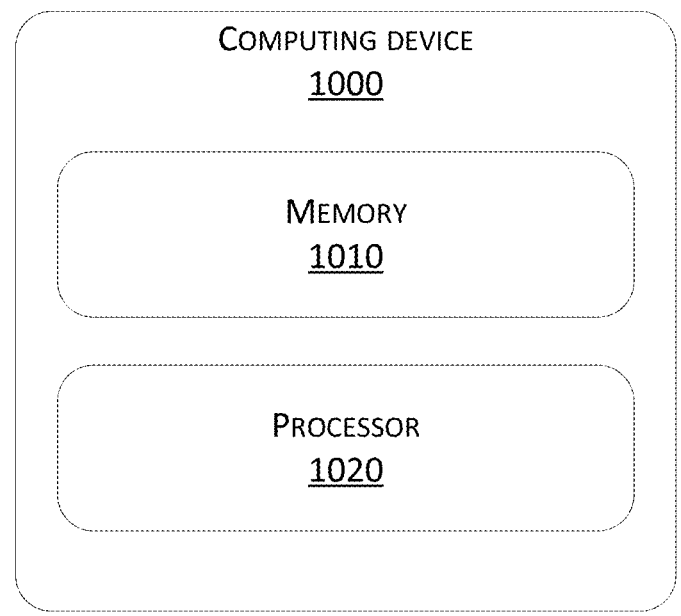
FIG. 10 is a schematic structural diagram of a computing device according to an embodiment of the present disclosure.

FIG. 10 is a schematic structural diagram of a computing device that may be configured to implement any one of the above text generation method, live broadcasting method, and information presentation method according to an embodiment of the present invention.

As shown in FIG. 10, a computing device 1000 includes a memory 1010 and a processor 1020.

The processor 1020 may be a multi-core processor or may include multiple processors. In some embodiments, the processor 1020 may include a general-purpose main processor and one or more special co-processors such as a graphics processing unit (GPU), a digital signal processor (DSP), etc. In some embodiments, the processor 1020 may be implemented using a customized circuit, such as an application-specific integrated circuit (ASIC) or a field-programmable gate array (FPGA).

The memory 1010 may include various types of storage units, such as a system memory, a read-only memory (ROM), and a permanent storage apparatus. The ROM may store static data or instructions required by the processor 1020 or by other modules of a computer. The permanent storage apparatus may be a readable and writable storage apparatus. The permanent storage apparatus may be a non-volatile storage device that does not lose stored instructions and data even after a computer is powered off. In some implementations, a mass storage apparatus (such as a magnetic disk, an optical disc, or a flash memory) is used as the permanent storage apparatus. In some other implementations, the permanent storage apparatus may be a removable storage device (such as a floppy disk or an optical drive). The system memory may be a readable and writable storage device or a volatile readable and writable storage device, such as a dynamic random-access memory. The system memory may store some or all instructions and data required by the processor at runtime. In addition, the memory 1010 may include any combinations of computer-readable storage media, including various types of semiconductor memory chips (a DRAM, an SRAM, an SDRAM, a flash memory, and a programmable read-only memory), or including a magnetic disk and/or an optical disk. In some implementations, the memory 1010 may include a readable and/or writable removable storage device, such as a compact disc (CD), a read-only digital multi-functional disc (such as a DVD-ROM or a dual-layer DVD-ROM), a read-only Blu-ray disc, an ultra-dense disc, a flash memory card (such as an SD card, a min SD card, or a Micro-SD card), a magnetic floppy disk, etc. The computer-readable storage medium does not include carrier or instantaneous electronic signal transmitted in a wireless or wired manner.

The memory 1010 stores thereon executable code, and the executable code, when processed by the processor 1020, may cause the processor 1020 to execute any one of the text generation method, broadcasting method, and information presentation method mentioned above.

The text generation method, the live broadcasting method, the information display method, the related apparatus, and the computing device of the present invention have been described in detail with reference to the accompanying drawings.

Furthermore, the method in the present invention may further be implemented as a computer program or a computer program product. The computer program or the computer program product includes computer program code instructions for implementing the steps defined in the above methods of the present invention.

Alternatively, the present invention may further be implemented as a non-transitory machine-readable storage medium (or a computer-readable storage medium or a machine-readable storage medium) having executable code (or a computer program or computer instruction code) stored thereon. The executable code (or a computer program or computer instruction code), when executed by a processor of an electronic device (or a computing device, a server, or the like), causes the processor to execute various steps of the above methods of the present invention.

It will further be appreciated by those skilled in the art that various exemplary logic blocks, modules, circuits, and algorithmic steps described with reference to the present disclosure herein may be implemented as electronic hardware, computer software, or a combination thereof.

The flowcharts and block diagrams in the accompanying drawings illustrate the architecture, function, and operation that may be implemented by the systems and methods in various embodiments of the present invention. In this regard, each block in the flowchart or block diagram may represent a module, a program segment, or a part of code, and the module, the program segment, or the part of code includes one or more executable instructions for implementing a specified logical function. It should also be noted that in some alternative implementations, the functions marked in the blocks may also occur in a sequence different from those marked in the accompanying drawings. For example, two consecutive blocks may actually be executed basically in parallel, or may sometimes be executed in a reverse order, depending on the related function. It should also be noted that each block in the block diagrams and/or the flowcharts, as well as a combination of blocks in the block diagrams and/or the flowcharts may be implemented in a dedicated hardware-based system that performs a specified function or operation, or may be implemented using a combination of dedicated hardware and computer instructions.

The embodiments of the present invention have been described above, and the above description is exemplary instead of limiting, and is not limited to the disclosed embodiments. Many modifications and changes will be apparent to those skilled in the art without departing from the scope and spirit of the described embodiments. The terms used herein are intended to best explain the principle of the embodiments, practical application, or improvement of the technology in the market, or to enable other persons with ordinary skill in the art to understand the embodiments disclosed herein.

What is claimed is:

1. A method used in live broadcasting, the method comprising:
    acquiring one or more pieces of source data related to an object to be presented in a live broadcast;
    analyzing the source data to obtain one or more pieces of material information;
    dividing the one or more pieces of material information into two parts according to functions, wherein a first part of the one or more pieces of material information is used for providing text paragraph information, and a second part of the one or more pieces of material information is used for creating a text output frame, the text output frame being used for determining an output sequence of the text paragraph information;
    parsing the first part of the one or more pieces of material information to obtain one or more pieces of corresponding text paragraph information;
    creating the text output frame according to at least one of respective occurrence frequencies or respective search popularities of attributes included in the second part of the one or more pieces of material information;
    generating a text describing the object based at least in part on the text output frame and the second part of the one or more pieces of corresponding text paragraph information using an encoder-decoder model, priorities of the attributes in the text output frame being positively correlated with the at least one of the respective occurrence frequencies or the respective search popularities of the attributes, wherein the attributes include an appearance characteristic, a function characteristic, a user characteristic, and an application scenario characteristic of the object, and generating the text describing the object comprises:
        inputting a name of the object, attribute information of the object, and the one or more pieces of corresponding text paragraph information into the encoder-decoder model to obtain the text; and
    enabling the text to be broadcast to a user through a voice playback on a user interface of an electronic device of the user when the object is presented in the live broadcast and a playback button presented on the user interface is clicked by the user.

2. The method according to claim 1, further comprising:
    selecting at least one piece of the one or more pieces of material information and at least one piece of the one or more pieces of corresponding text paragraph information;
    converting the at least one piece of text paragraph information into voice information;
    combining the at least one piece of material information and the voice information into demo data; and
    presenting the demo data on the user interface.

3. The method according to claim 1, wherein generating the text describing the object using the second part of the one or more pieces of corresponding text paragraph information further comprises:
   determining, based on the text output frame, an output sequence of the second part of the one or more pieces of corresponding text paragraph information to generate the text.

4. The method according to claim 3, further comprising:
   outputting the text paragraph information according to the output sequence.

5. The method according to claim 3, further comprising:
   adjusting the text output frame based on an external input.

6. The method according to claim 1, wherein analyzing the source data to obtain the one or more pieces of material information comprises:
   analyzing the attributes of the source data.

7. The method according to claim 6, further comprising:
   calculating a similarity level between materials having different attributes; and
   combining attributes corresponding to materials having a similarity level greater than a threshold into one attribute.

8. The method according to claim 1, further comprising:
   adjusting the text output frame based on at least one of an audio material or a video material.

9. The method according to claim 1, wherein the source data comprises data in multiple modalities.

10. The method according to claim 9, wherein the source data comprises pictures, texts, images, sound, and a combination thereof.

11. The method according to claim 1, wherein analyzing the source data to obtain the one or more pieces of material information comprises at least one of:
   identifying text information in a picture to obtain first material information comprising the picture and the text information;
   obtaining, based on a first text, second material information comprising a second text used for describing the object; or
   analyzing audiovisual data to obtain third material information comprising at least one of video data, a speech recognition result of the audiovisual data, or audiovisual analysis data.

12. The method according to claim 1, wherein the material information comprises at least one of a text material, an audio material, a picture material, or a video material.

13. The method according to claim 12, wherein parsing the part part of the one or more pieces of material information to obtain the one or more pieces of corresponding text paragraph information comprises at least one of:
   performing speech recognition on the audio material to obtain text paragraph information corresponding to the audio material; or
   performing semantic understanding on at least one of the picture material or the video material to obtain text paragraph information corresponding to the at least one of the picture material or the video material.

14. The method according to claim 1, wherein the material information comprises:
   unprocessed source data; and
   processed data having undergone preset analysis processing.

15. An apparatus used in live broadcasting, the apparatus comprising:
   one or more processors; and
   one or more memories storing thereon computer-readable instructions that, when executed by the one or more processors, cause the one or more processors to perform acts comprising:
      acquiring one or more pieces of source data related to an object to be presented in a live broadcast;
      analyzing the source data to obtain one or more pieces of material information;
      dividing the one or more pieces of material information into two parts according to functions, wherein a first part of the one or more pieces of material information is used for providing text paragraph information, and a second part of the one or more pieces of material information is used for creating a text output frame, the text output frame being used for determining an output sequence of the text paragraph information;
      parsing the first part of the one or more pieces of material information to obtain one or more pieces of corresponding text paragraph information;
      creating the text output frame according to at least one of respective occurrence frequencies or respective search popularities of attributes included in the second part of the one or more pieces of material information;
      generating a text describing the object based at least in part on the text output frame and the second part of the one or more pieces of corresponding text paragraph information using an encoder-decoder model, priorities of the attributes in the text output frame being positively correlated with the at least one of the respective occurrence frequencies or the respective search popularities of the attributes, wherein the attributes include an appearance characteristic, a function characteristic, a user characteristic, and an application scenario characteristic of the object, and generating the text describing the object comprises:
         inputting a name of the object, attribute information of the object, and the one or more pieces of corresponding text paragraph information into the encoder-decoder model to obtain the text; and
      enabling the text to be broadcast through a voice playback on a user interface when the object is presented in the live broadcast.

16. One or more memories storing thereon computer-readable instructions that, when executed by one or more processors, cause the one or more processors to perform acts comprising:
   acquiring one or more pieces of source data related to an object to be presented in a live broadcast;
   analyzing the source data to obtain one or more pieces of material information;
   dividing the one or more pieces of material information into two parts according to functions, wherein a first part of the one or more pieces of material information is used for providing text paragraph information, and a second part of the one or more pieces of material information is used for creating a text output frame, the text output frame being used for determining an output sequence of the text paragraph information;
   parsing the first part of the one or more pieces of material information to obtain one or more pieces of corresponding text paragraph information;
   creating the text output frame according to at least one of respective occurrence frequencies or respective search popularities of attributes included in the second part of the one or more pieces of material information;

generating a text describing the object based at least in part on the text output frame and the second part of the one or more pieces of corresponding text paragraph information using an encoder-decoder model, priorities of the attributes in the text output frame being positively correlated with the at least one of the respective occurrence frequencies or the respective search popularities of the attributes, wherein the attributes include an appearance characteristic, a function characteristic, a user characteristic, and an application scenario characteristic of the object, and generating the text describing the object comprises:

inputting a name of the object, attribute information of the object, and the one or more pieces of corresponding text paragraph information into the encoder-decoder model to obtain the text; and enabling the text to be broadcast through a voice playback on a user interface when the object is presented in the live broadcast.

17. The one or more memories according to claim 16, wherein the source data comprises association relationships between contents of the live broadcast at different times and respective indicator data at the different times.

* * * * *